United States Patent
Shin et al.

(10) Patent No.: US 10,609,161 B2
(45) Date of Patent: Mar. 31, 2020

(54) SYSTEM AND METHOD FOR CONTROLLING OPERATION OF IOT DEVICE

(71) Applicants: HYUNDAI MOTOR COMPANY, Seoul (KR); KIA MOTORS CORPORATION, Seoul (KR)

(72) Inventors: Hyoung Shin, Yongin-si (KR); Hui Sung Lee, Gunpo-si (KR); Youngwook Song, Seoul (KR); Kichang Yi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 253 days.

(21) Appl. No.: 15/794,713

(22) Filed: Oct. 26, 2017

(65) Prior Publication Data
US 2018/0278699 A1 Sep. 27, 2018

(30) Foreign Application Priority Data
Mar. 24, 2017 (KR) .................. 10-2017-0037398

(51) Int. Cl.
| | |
|---|---|
| G06F 15/173 | (2006.01) |
| H04L 29/08 | (2006.01) |
| G06F 9/4401 | (2018.01) |
| G06F 1/3231 | (2019.01) |
| G06F 1/3296 | (2019.01) |

(Continued)

(52) U.S. Cl.
CPC ............ *H04L 67/18* (2013.01); *G06F 1/3231* (2013.01); *G06F 1/3243* (2013.01); *G06F 1/3287* (2013.01); *G06F 1/3296* (2013.01); *G06F 9/4411* (2013.01); *G06F 9/4418* (2013.01); *H04L 67/12* (2013.01)

(58) Field of Classification Search
CPC ....... H04L 67/18; H04L 67/12; G06F 1/3231; G06F 1/3287; G06F 1/3296; G06F 9/4418
See application file for complete search history.

(56) References Cited

U.S. PATENT DOCUMENTS

| | | | |
|---|---|---|---|
| 10,002,526 B1* | 6/2018 | Dyer ...................... G08C 17/02 |
| 2014/0273858 A1* | 9/2014 | Panther ................ A61B 5/0002 |
| | | | 455/41.2 |

(Continued)

*Primary Examiner* — Razu A Miah
(74) *Attorney, Agent, or Firm* — Morgan, Lewis & Bockius LLP

(57) ABSTRACT

A method for controlling operation of an internet of things device includes: controlling, by a processor, a first device to be in an on state and controlling the processor to be in a sleep mode when the processor determines that a user is located outside a place object; receiving, by the processor, a control signal from the first device and waking up to an operation mode; controlling, by the processor, a second device to be in an on state, wherein the second device is installed in an entrance side of the place object and detects a user's entry into the place object; controlling, by the processor, the processor to be connected to an external control device, controlling the first device and the second device to be in an off state, and controlling a third device to be in an on state when the user's entry into the place object is detected; and detecting, by the processor, whether the user is located inside the place object using an output of the third device.

7 Claims, 6 Drawing Sheets

(51) Int. Cl.
*G06F 1/3287* (2019.01)
*G06F 1/3234* (2019.01)

(56) References Cited

U.S. PATENT DOCUMENTS

| | | | | |
|---|---|---|---|---|
| 2014/0278220 A1* | 9/2014 | Yuen | ...................... | G01B 21/16 |
| | | | | 702/150 |
| 2015/0006695 A1* | 1/2015 | Gupta | ..................... | H04L 67/18 |
| | | | | 709/223 |
| 2015/0201022 A1* | 7/2015 | Kim | ........................ | H04W 4/70 |
| | | | | 709/203 |
| 2015/0264626 A1* | 9/2015 | Perdomo | ............... | H04W 40/12 |
| | | | | 370/216 |
| 2015/0358777 A1* | 12/2015 | Gupta | ................. | H04L 12/2807 |
| | | | | 370/254 |
| 2016/0050279 A1* | 2/2016 | Pahng | .................... | H04L 67/12 |
| | | | | 705/26.41 |
| 2016/0085594 A1* | 3/2016 | Wang | ..................... | H04L 67/18 |
| | | | | 709/226 |
| 2016/0105292 A1* | 4/2016 | Choi | ........................ | H04L 51/02 |
| | | | | 709/206 |
| 2016/0135241 A1* | 5/2016 | Gujral | ..................... | H04W 4/70 |
| | | | | 370/328 |
| 2016/0198285 A1* | 7/2016 | Lin | .......................... | H04W 4/38 |
| | | | | 709/209 |
| 2016/0234633 A1* | 8/2016 | Huang | .................... | H04L 67/12 |
| 2016/0344841 A1* | 11/2016 | Wang | ..................... | H04L 67/12 |
| 2016/0378169 A1* | 12/2016 | Naeimi | ................. | G06F 1/3275 |
| | | | | 713/323 |
| 2017/0019460 A1* | 1/2017 | Gu | ............................ | H04L 67/12 |
| 2017/0061404 A1* | 3/2017 | Tunnell | .............. | G06Q 30/0255 |
| 2017/0180489 A1* | 6/2017 | Oh | ............................ | H04L 67/16 |
| 2017/0201585 A1* | 7/2017 | Doraiswamy | ....... | H04L 41/0806 |
| 2018/0034655 A1* | 2/2018 | Christopher | .......... | H04L 12/283 |
| 2018/0077449 A1* | 3/2018 | Herz | ....................... | H04W 4/38 |
| 2018/0285062 A1* | 10/2018 | Ulaganathan | .......... | G06F 3/167 |
| 2019/0081961 A1* | 3/2019 | Bansal | .................. | H04L 63/20 |

* cited by examiner

--PRIOR ART--

SYSTEM AND METHOD FOR CONTROLLING OPERATION OF IOT DEVICE

CROSS-REFERENCE TO RELATED APPLICATION

This application is based on and claims the benefit of priority to Korean Patent Application No. 10-2017-0037398 filed on Mar. 24, 2017 with the Korean Intellectual Property Office, the entire contents of which are incorporated herein by reference.

TECHNICAL FIELD

The present disclosure relates to a system and a method for controlling operation of an internet of things (IoT) device for selectively activating or deactivating the IoT device and a related device installed in a place such as a vehicle or a house based on a location of a user.

BACKGROUND

An internet of things (IoT) is an internet in which all kinds of tangible and intangible things such as people, places, or processes are connected. As shown in FIG. 1, an IoT device constituting the IoT includes a central processing unit 10, a sensor 20, and an actuator 30 installed in a thing, and a control device (e.g., a smart phone) 40 controlling the thing.

The sensor 20 detects occurrence of a specific situation, and the central processing unit 10 connects to the internet to analyze information and controls operation of the actuator 30. The actuator 30 performs an operation corresponding to control of the central processing unit 10. For example, the actuator 30 generates a specific signal or performs a physical operation. The control device 40 is connected to the central processing unit 10 via the internet to monitor information sensed by the sensor 20 or generate a control signal for controlling operation of the actuator 30.

Power is always applied to the central processing unit 10, the sensor 20, and the actuator 30. However, in a state where a control signal is not received from the control unit 40, the central processing unit 10, the sensor 20, and the actuator 30 operate in a sleep mode for low power operation so that only a minimum number of functions are used. It takes time to cancel the sleep mode when the central processing unit 10 receives a control signal of the control device 40 while operating in the sleep mode. Accordingly, an operation error corresponding to the control signal may be generated.

In addition, the central processing unit 10 may have a risk of hacking while operating in response to the control signal of the control unit 40 during operation. For example, the central processing unit 10 performs a wakeup operation in the sleep mode in accordance with the control signal of the control device 40 when the user requests to turn on a boiler via the control device 40 5 minutes before the user arrives home, continuously monitors position of the control device 40 through a broadband communication network to detect the position of the user, and activates the boiler when it is detected that the user will arrive home after 5 minutes. Thus, the central processing unit 10 keeps an on state after detecting five minutes before the user arrives home and operating the boiler, thereby causing a problem of being vulnerable to security such as hacking, as shown in FIG. 2.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a system and a method for controlling operation of an internet of things (IoT) device which are capable of enhancing security by separating a connection structure of a processor according to an external condition.

Further, the present disclosure has been made in an effort to provide the system and the method for controlling operation of the IoT device which are capable of minimizing power consumption by operating a controlled object according to a user's position.

In addition to the above-mentioned objects, an exemplary embodiment of the present disclosure may be used for other objects that are not mentioned in detail.

An exemplary embodiment of the present disclosure may provide the method for controlling operation of the IoT device, including: controlling, by a processor, a first device to be in an on state and controlling the processor to be in a sleep mode when the processor determines that a user is located outside a place object; receiving, by the processor, a control signal from the first device and waking up to an operation mode; controlling, by the processor, a second device to be in an on state, wherein the second device is installed in an entrance side of the place object and detects a user's entry into the place object; controlling, by the processor, the processor to be connected to an external control device, controlling the first device and the second device to be in an off state, and controlling a third device to be in an on state when the user's entry into the place object is detected; and detecting, by the processor, whether the user is located inside the place object using an output of the third device.

The method for controlling operation of the IoT device may further include: controlling, by the processor, the second device detecting whether the user exits outside of the place object to be in an on state when the processor determines that the user is not located inside the place object using the output of the third device.

The processor may determine that the user is located outside the place object when the processor determines that the user is not located inside the place object using the output of the third device and the processor processor determines that the user exits outside of the place object using the second device.

The processor may control a second device to be in the on state when the processor detects that the user located outside the place object moves to the place object.

An exemplary embodiment of the present disclosure may provide the system for controlling operation of the IoT device, including: a first device configured to receive a control signal transmitted from an external control device and transmit the received control signal; a second device that is installed in an entrance side of a place object and is configured to detect a user's entry into the place object; a third device that is located inside the place object and is configured to inform that the user is inside the place object by transmitting an operation signal; and a processor configured to operate in a sleep mode when the user is outside the place object, wake up in response to the control signal received from the first device, turn off the first device when the second device detects the user, and selectively control power application states of the second device and the third device based on a location of the user.

The processor may turn on the second device when the user located outside the place object moves to the place object. The processor may be connected to the control device and may turn off the first device when the user's entry into the place object is detected by the second device.

The processor may turn off the second device and may turn on the third device when the user's entry into the place object is detected by the second device. The processor may turn on the first device, may turn off the second device and the third device, and may go into the sleep mode when the processor determines that the user is located outside the place object.

The exemplary embodiments of the present disclosure may enhance security by separating an external control signal and an internal operation signal according to a user condition. Further, the exemplary embodiment of the present disclosure may selectively apply power based on the position of the user, thereby minimizing power consumption.

DETAILED DESCRIPTION

Figure 1:
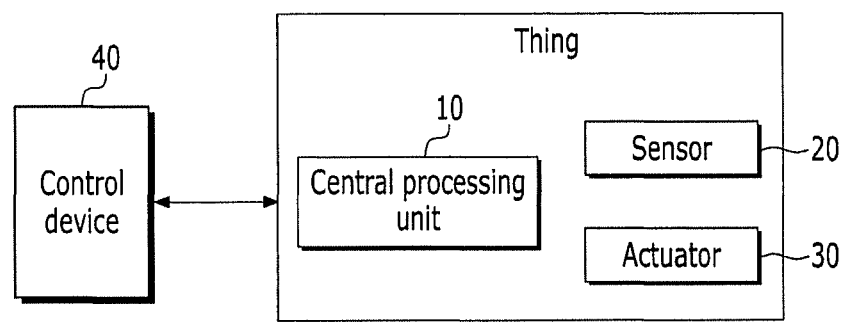
FIG. 1 is a diagram showing an internet of things (IoT) device constituting a conventional an internet of things (IoT).
Figure 2:
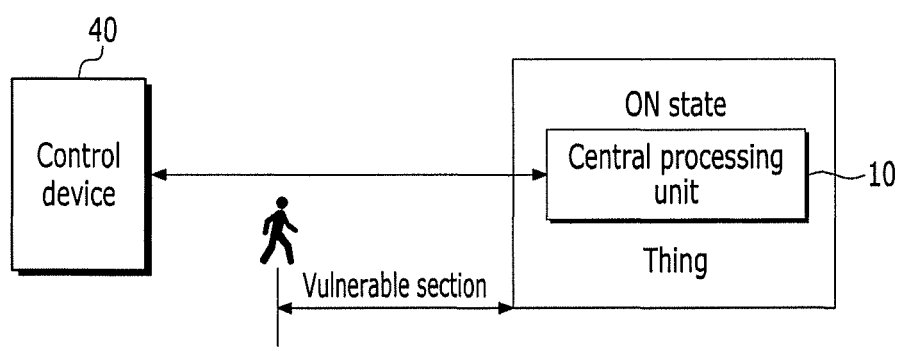
FIG. 2 is a diagram illustrating a state of a processor when the IoT is used according to a related art.

An exemplary embodiment of the present disclosure will hereinafter be described in detail with reference to the accompanying drawings. In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification. Further, detailed descriptions of well-known technology may be omitted.

Unless explicitly described to the contrary, the word "comprise" or variations such as "comprises" or "comprising" will be understood to imply the inclusion of stated elements but not the exclusion of any other elements. In addition, throughout this specification and the claims which follow, a module means a unit that performs a specific function or operation, and can be realized by hardware or software, or a combination of both.

Hereinafter, a system and a method for controlling operation of an internet of things (IoT) device according to an exemplary embodiment of the present disclosure will be described with reference to the accompanying drawings.

Figure 3:
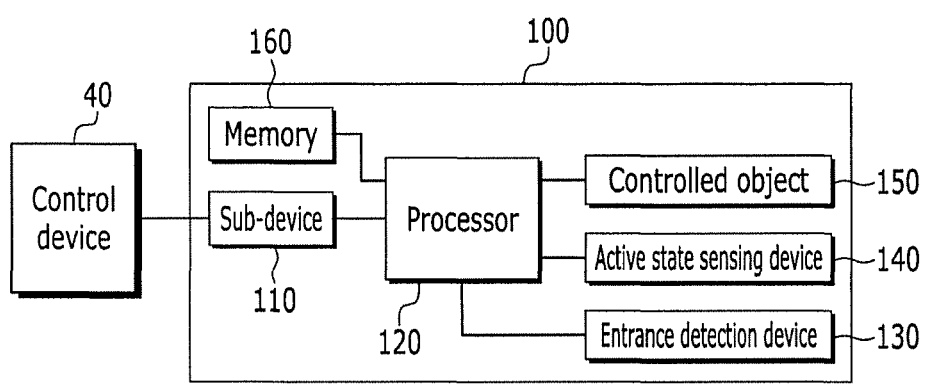
FIG. 3 is a block diagram of a system for controlling an operation of an internet of things (IoT) device according to an exemplary embodiment of the present disclosure.

FIG. 3 is a block diagram of a system for controlling an operation of an internet of things (IoT) device according to an exemplary embodiment of the present disclosure. Referring to FIG. 3, the system for controlling an operation of the IoT device 100 includes a sub-device 110, a processor 120, an entrance detection device or an access detection device 130, an active state sensing device 140, a controlled object 150, and a memory 160.

The sub-device 110 may be a device preventing an external device such as the control device 40 from being directly connected to the processor 120. The sub-device 110 may cause the processor 120 in a sleep mode to wake up and operate according to request of an authenticated control device 40. The sub-device 110 may be installed outside or inside a place or a place object (e.g., a vehicle, a ship, an airplane, a factory, a house, a building, a room, etc.). The control device 40 may be a communication device provided with an application for controlling the IoT device, and a control signal may be provided from the application.

The processor 120 is an electric circuitry that executes instructions of software which thereby performs various functions described hereinafter.

The memory 160 is configured to store functions of the processor 120.

The entrance detection device 130 may detect whether a user enters inside or exits outside of the place, and may inform the processor 120 of the entry of the user or the exit of the user. The entrance detection device 130 may be installed on a door or a door of the vehicle, but is not limited thereto. For example, the entrance detection device 130 may be a door lock device or an outside handle of the vehicle.

The active state sensing device 140 may detect whether the user is located inside the place and may inform the processor 120 of a result of the detection. The active state sensing device 140 may the IoT device capable of detecting whether the user is located inside the place or the place object. For example, the active state sensing device 140 may be at least one of a television, a computer, or an electronic device installed in the house, the building, or the a room, an accelerator pedal, a brake pedal, a start switch, or various electronic devices of the vehicle, and a smartphone holder. Thus, the active state sensing device 140 may be one IoT device or a plurality of IoT devices.

The processor 120 may be connected to each of the devices 110, 130, and 140. The processor 120 may determine the location of the user using signals received from the respective devices 110, 130, and 140, and may control whether the devices 110, 130, and 140 are powered on (i.e., switching between an on state and an off state). The processor 120 may control operation of the controlled object 150 in response to the control signal of the control device 40. The processor 120 may operate in the sleep mode when the user is located outside and the control signal of the control device 40 is not received through the sub-device 110.

The controlled object 150 may be various IoT devices installed in a position object or a position such as a window, a door, a tailgate, a seat, a steering wheel, an audio, or an outside mirror of the vehicle.

The processor 120 and the active state sensing device 140 may be installed inside the place object.

Figure 4:
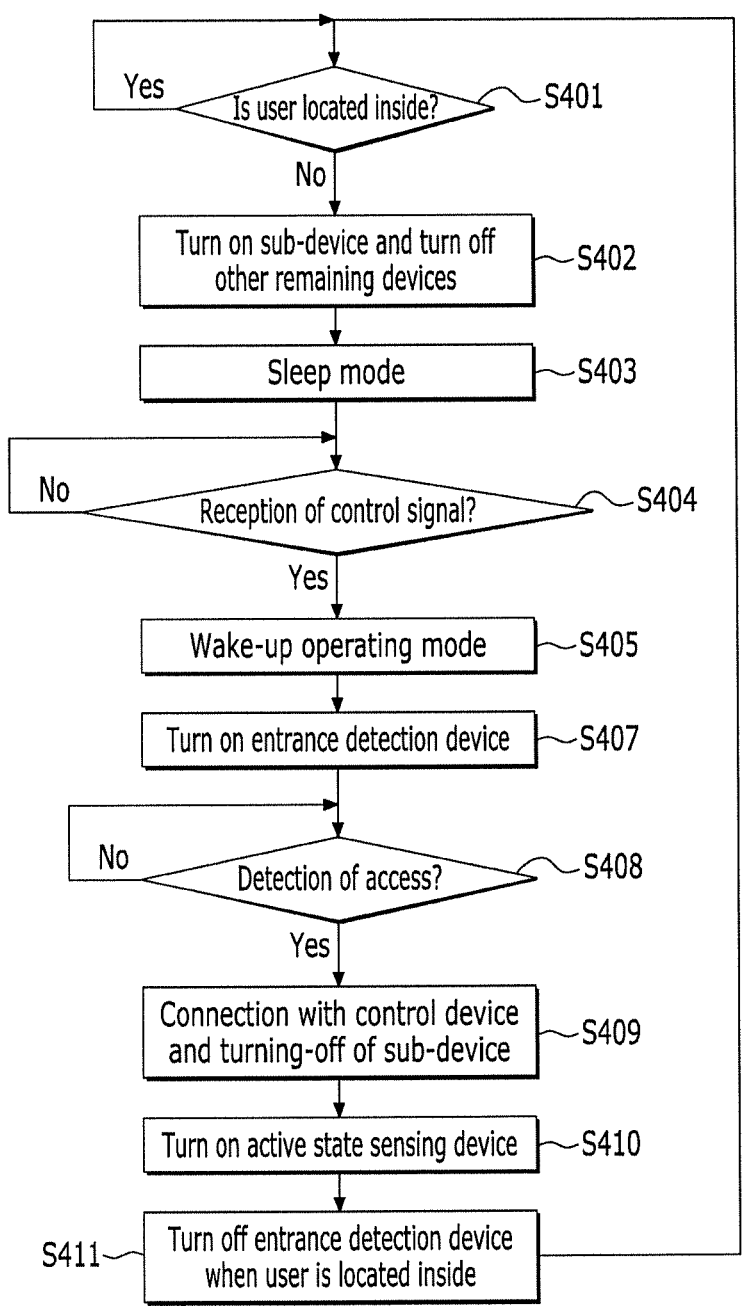
FIG. 4 is a flowchart illustrating a method for controlling an operation of the IoT device according to an exemplary embodiment of the present disclosure.

Hereinafter, a method for controlling an operation of the IoT device will be described with reference to FIG. 4. FIG. 4 is a flowchart illustrating the method for controlling the operation of the IoT device according to an exemplary embodiment of the present disclosure, in which a current position of a user is located inside the place object.

Referring to FIG. 4, the processor 120 may determine whether the user is located inside the place object using the active state sensing device 140 in step S401. When the processor 120 determines that the user is continuously located inside the place object, the processor 120 may maintain a power state of each of the devices 110, 130, and 140. When the processor 120 determines that the user is not located inside the place object, the processor 120 may turn on the sub-device 110 by supplying a power to the sub-device 110 and may turn off the other remaining devices 130, 140, and 150 by not supplying a power to the other remaining devices in step S402.

The processor 120 may operate in the sleep mode in step S403.

When the processor 120 is in the sleep mode and the user transmits a control signal to the control device 40, the processor 120 may receive the control signal through the sub-device 110 in step S404 and may cancel the sleep mode to wake up in step S405.

The processor 120 causes power to be supplied to the entrance detection device 130 in order to determine whether the user enters a place object, thereby bringing the entrance detection device 130 into an on state in step S407. When the user is not moving to the place object, it is meaningless to turn on the entrance detection device 130. Therefore, a process of detecting whether the user is moving to the place object by detecting whether the application for controlling the IoT device is executed or a type of the control signal may be preceded.

When the user arrives at the place object, the entrance detection device 130 may detect the user by operation of the user or by recognizing the user and may provide a detection signal to the processor 120 in step S408.

When the processor 120 detects that the user enters the place object by the detection signal of the entrance detection device 130, the processor 120 may be connected to the control device 40 and may control the sub-device 110 to be powered off in step S409.

The processor 120 may cause the active state sensing device 140 to be powered on in step S410. The processor 120 may turn off the entrance detection device 130 to prevent power from being supplied to the entrance detection device 130 when the active state sensing device 140 detects the user (e.g., when the active state sensing device detects that the user's mobile phone is in a mobile phone holder or when the active state sensing device detects that the user starts the vehicle, presses the brake pedal, or presses the accelerator pedal) in step S411.

Hereinafter, an exemplary embodiment of the method for controlling the operation of the IoT device will be described with reference to FIGS. 5 and 6.

Figure 5:
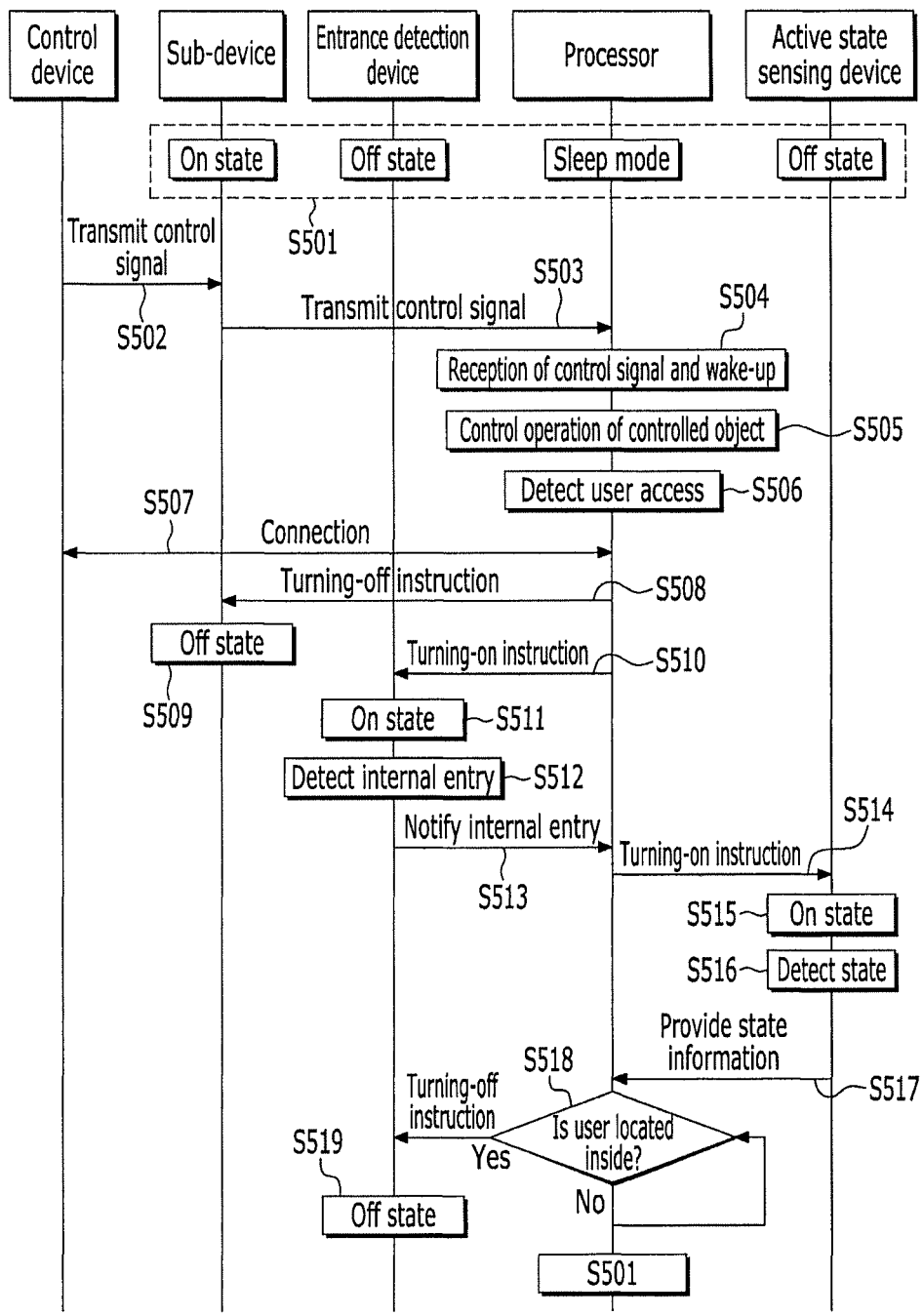
FIG. 5 is a flowchart showing a method for controlling an operation of the IoT device regarding a vehicle according to an exemplary embodiment of the present disclosure.

FIG. 5 is a flowchart showing a method for controlling an operation of the IoT device regarding a vehicle according to an exemplary embodiment of the present disclosure, in which the user enters the interior of the vehicle in a state where the user is located outside.

When the user is outside the vehicle, the sub-device 110 may be turned on to receive the control signal of the control device 40, the processor 120 may be in the sleep mode, and the entrance detection device 130, the active state sensing device 140, and the controlled object 150 may be in an off state in step S501.

In this state, when the user transmits the control signal using the application of the control device 40 in step S502, the sub-device 110 may receive the control signal from the control device 40 and may transmit the received control signal to the processor 120 in step S503.

When the processor 120 receives the control signal, the processor 120 may wake up to a normal mode in step S504, and may turn on the corresponding controlled object 150 in response to the control signal in step S505. The processor 120 may detect an access state of the user by detecting whether the application for controlling the IoT device is running, whether a smart key is held by the user, or whether control operation in response to the control signal is for the user to come to the vehicle in step S506.

When the processor 120 determines that the user is coming to the vehicle, the processor 120 may be connected to the control device 40 in step S507, may turn off the sub-device 110 in steps S508 and S509, and may turn on the entrance detection device 130 in steps S510 and S511. If it is determined that the user is staying in the outside, the processor 120 may keep the sub-device 110 in an on state and then may switch to the sleep mode again.

The entrance detection device 130 in an on state may notify the processor 120 of the user's entry into the vehicle in step S513 when the entrance detection device 130 detects the user's entry into the vehicle in step S512, and the processor 120 may turn on the active state sensing device 140 and the controlled object 150 in steps S514 and S515.

The active state sensing device 140 may detect whether the active state sensing device is in an operating state in step S516, and may inform the processor 120 of the state in step S517. When the processor 120 receives a signal indicating that the active state sensing device 140 is in the operating state from the active state sensing device, the processor 120 may determine that the user is located inside the vehicle in step S518 and may turn off the entrance detection device 130 in step S519.

However, when the processor 120 does not receive the signal from the active state sensing device 140 during a predetermined time period or receives a signal indicating that the active state sensing device 140 is not in the operating state, the processor 120 may determine that the user is not located inside the vehicle.

Figure 6:
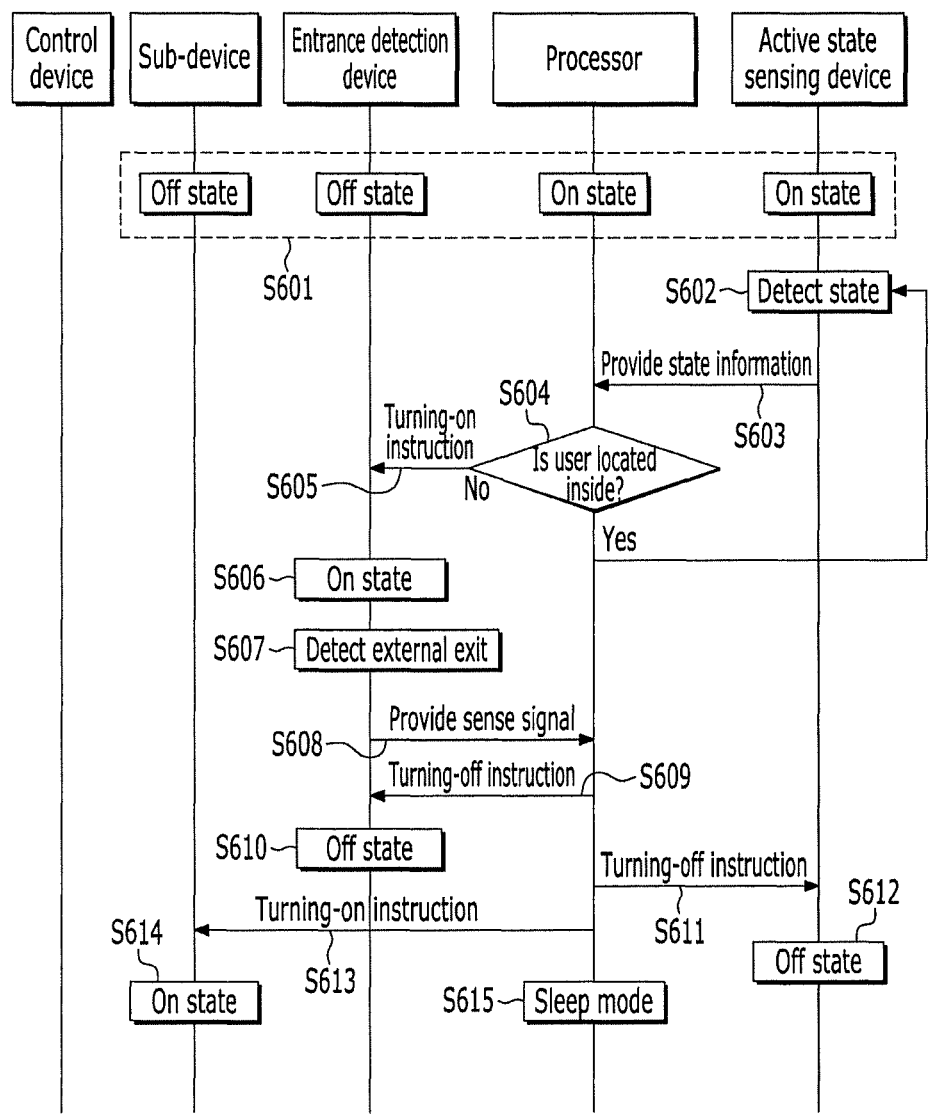
FIG. 6 is a flowchart showing a method for controlling an operation of the IoT device regarding a vehicle according to another exemplary embodiment of the present disclosure.

FIG. 6 is a flowchart showing a method of controlling an operation of the IoT device regarding a vehicle according to another exemplary embodiment of the present disclosure. FIG. 6 represents when the user exits outside of the vehicle while being located inside the vehicle.

The sub-device 110 and the entrance detection device 130 may be in an off state, and the processor 120, the active state sensing device 140, and the controlled object 150 may be in an on state when the user is inside the vehicle in step S601.

In this state, the active state sensing device 140 may detect whether the active state sensing device is in an operating state in step S602, and may provide the state to the processor 120 in step S603. The processor 120 may determine that the user is located inside the vehicle when the processor 120 receives a signal indicating that the active state sensing device 140 is in the operating state from the active state sensing device in step S604, and may keep an on state to wait for reception of state information on the active state sensing device.

However, when the processor 120 does not receive the signal from the active state sensing device 140 during a predetermined time period or receives a signal indicating that the active state sensing device 140 is not in the operating state, the processor 120 may determine that the user exits outside of the vehicle so that the processor 120 turns on the entrance detection device 130 in steps S605 and S606.

In this state, when the processor 120 receives the signal indicating that the active state sensing device 140 is in the operating state, the processor 120 may turn off the entrance detection device 130. When the processor 120 receives the signal indicating that the active state sensing device 140 is in the operating state and a detection signal from the entrance detection device 130, the processor 120 may generate a warning sound so that it is informed that the IoT device in the vehicle is operating.

However, when the signal indicating that the active state sensing device 140 is in the operating state is not received from the active state sensing device 140 and the detection signal is received from the entrance detection device 130 in steps S607 and S608, the processor 120 may determine that the user exits outside of the vehicle so that the processor turns off the entrance detection device 130 in steps S609 and S610, turns off the active state sensing device 140 in steps S611 and S612, and turns on the sub-device 110 in steps S613 and S614.

Then, the processor 120 may enter the sleep mode in step S615.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling operation of an internet of things (IoT) device, comprising:
    controlling, by a processor, a sub-device to be in an on state and controlling the processor to be in a sleep mode when the processor determines that a user is located outside a place object;
    receiving, by the processor, a control signal from the sub-device and waking up the processor to be in an operation mode in response to the control signal received from the sub-device;
    controlling, by the processor, an entrance detection device to be in an on state, wherein the entrance detection device is located in an entrance side of the place object and detects a user's entry into the place object;
    when the user's entry into the place object is detected by the entrance detection device, controlling, by the processor, the processor to be connected to an external control device, controlling the sub-device and the entrance detection device to be in an off state, and controlling an active state sensing device to be in an on state, wherein the active state sensing device is located inside the place object and detects the user located inside the place object; and
    determining, by the processor, whether the user is located inside the place object using an output of the active state sensing device,
    wherein the processor turns on the sub-device, turns off the entrance detection device and the active state sensing device, and goes into the sleep mode when the processor determines that the user is located outside the place object.

2. The method of claim 1, further comprising:
    controlling, by the processor, the entrance detection device detecting whether the user exits outside of the place object to be in an on state when the processor determines that the user is not located inside the place object using the output of the active state sensing device.

3. The method of claim 2, wherein the processor determines that the user is located outside the place object when the processor determines that the user is not located inside the place object using the output of the active state sensing device and the processor determines that the user exits outside of the place object using the entrance detection device.

4. The method of claim 1, wherein the processor controls the entrance detection device to be in the on state when the processor detects that the user located outside the place object moves to the place object.

5. A system for controlling operation of an internet of things (IoT) device, comprising:
    a processor coupled to a memory storing functions of the processor;
    a sub-device configured to receive a control signal transmitted from an external control device and transmit the received control signal;
    an entrance detection device that is located in an entrance side of a place object and is configured to detect a user's entry into the place object; and
    an active state sensing device that is located inside the place object and is configured to inform that the user is inside the place object by transmitting an operation signal,
    wherein the processor is configured to:
        operate in a sleep mode when the user is outside the place object,
        wake up in response to the control signal received from the sub-device,
        turn off the sub-device and the entrance detection device and turn on the active state sensing device when the user's entry into the place object is detected by the entrance detection device, and
        turn on the sub-device, turn off the entrance detection device and the active state sensing device, and go into the sleep mode when the processor determines that the user is located outside the place object.

6. The system of claim 5, wherein the processor turns on the entrance detection device when the user located outside the place object moves to the place object.

7. The system of claim 5, wherein the processor is connected to the external control device and turns off the sub-device when the user's entry into the place object is detected by the entrance detection device.

* * * * *